(12) United States Patent
Touboul et al.

(10) Patent No.: US 11,758,513 B2
(45) Date of Patent: Sep. 12, 2023

(54) PHYSICAL UPLINK CONTROL CHANNEL WITH UPLINK MESSAGE SHORT DATA FIELD

(71) Applicant: QUALCOMM Incorporated, San Diego, CA (US)

(72) Inventors: Assaf Touboul, Netanya (IL); Ran Berliner, Kfar-Aviv (IL); Albert Yosher, Tel Mond (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/852,911

(22) Filed: Apr. 20, 2020

(65) Prior Publication Data
US 2021/0329589 A1    Oct. 21, 2021

(51) Int. Cl.
*H04W 68/00* (2009.01)
*H04L 5/00* (2006.01)
(Continued)

(52) U.S. Cl.
CPC .......... *H04W 68/005* (2013.01); *H04L 5/0055* (2013.01); *H04W 28/06* (2013.01); *H04W 72/21* (2023.01); *H04W 80/06* (2013.01)

(58) Field of Classification Search
CPC ............... H04W 68/005; H04W 28/06; H04W 72/0413; H04W 80/06; H04W 72/14;
(Continued)

(56) References Cited

U.S. PATENT DOCUMENTS 9,479,246 B2 * 10/2016 Park ..................... H04B 7/2612
10,880,895 B2    12/2020 Gordaychik
(Continued)

FOREIGN PATENT DOCUMENTS

CA    2859961 A1    6/2013
CA    3050124 A1    9/2018
(Continued)

OTHER PUBLICATIONS

Intel Corporation: "Scheduling Request Design for NR", 3GPP TSG RAN WG1 Meeting #88bis, 3GPP Draft, R1-1704760 Intel SR Design, 3rd Generation Partnership Project (3GPP), Mobile Competence Centre, France, vol. RAN WG1, No. Spokane, USA, Apr. 3, 2017-Apr. 7, 2017, Apr. 2, 2017, XP051242897, Retrieved from the Internet: URL: http://www.3gpp.org/ftp/Meetings_3GPP_SYNC/RAN1/Docs/ [retrieved on Apr. 2, 2017] 4 pages.
(Continued)

*Primary Examiner* — Rebecca E Song
(74) *Attorney, Agent, or Firm* — The Marbury Law Group, PLLC

(57) ABSTRACT

Embodiments include systems and methods for communicating information in a physical uplink control channel (PUCCH) message. A processor of a wireless device may configure a PUCCH message to include an uplink message in a short data field. The processor may send the PUCCH message including the short data field to convey the uplink message to a communication network. In some embodiments, the processor may receive data from a second wireless device in a downlink channel, and may generate an acknowledgement message responsive to the received data. The processor may configure the short data field to include the acknowledgement message, and may send the PUCCH message including the short data field that includes the acknowledgement message to acknowledge the received data.

24 Claims, 11 Drawing Sheets

(51) Int. Cl.
*H04W 28/06* (2009.01)
*H04W 80/06* (2009.01)
*H04W 72/21* (2023.01)

(58) Field of Classification Search
CPC ..... H04L 5/0055; H04L 1/165; H04L 1/1671; H04L 1/1854; H04L 1/1874; H04L 1/1887
USPC ................ 370/329, 310.2; 455/450, 418
See application file for complete search history.

(56) References Cited

U.S. PATENT DOCUMENTS

| | | | |
|---|---|---|---|
| 10,904,940 B2 | 1/2021 | Zhou et al. | |
| 11,252,753 B2 | 2/2022 | Chen | |
| 2009/0125650 A1 | 5/2009 | Sebire | |
| 2009/0175229 A1 | 7/2009 | Tseng | |
| 2010/0290439 A1* | 11/2010 | Dai | H04L 1/16 370/336 |
| 2013/0044699 A1 | 2/2013 | Eriksson et al. | |
| 2013/0301569 A1* | 11/2013 | Wang | H04L 1/1671 370/329 |
| 2014/0177584 A1 | 6/2014 | Ouchi et al. | |
| 2014/0204872 A1* | 7/2014 | Yang | H04L 69/24 370/329 |
| 2014/0233553 A1* | 8/2014 | Gao | H04L 1/1607 370/338 |
| 2014/0269352 A1 | 9/2014 | Sun et al. | |
| 2015/0071260 A1 | 3/2015 | Chun et al. | |
| 2015/0181593 A1 | 6/2015 | Kim et al. | |
| 2015/0201418 A1 | 7/2015 | Zhang et al. | |
| 2015/0222406 A1* | 8/2015 | Zheng | H04L 5/0055 370/329 |
| 2015/0230248 A1 | 8/2015 | Kim et al. | |
| 2016/0036701 A1* | 2/2016 | Park | H04W 72/04 370/329 |
| 2016/0119945 A1 | 4/2016 | Fang et al. | |
| 2016/0157268 A1 | 6/2016 | Wakabayashi et al. | |
| 2016/0173662 A1* | 6/2016 | Seok | H04L 1/1628 370/252 |
| 2016/0198327 A1* | 7/2016 | Park | H04L 27/261 370/330 |
| 2016/0205025 A1 | 7/2016 | Wakabayashi et al. | |
| 2016/0345295 A1* | 11/2016 | Yang | H04W 74/002 |
| 2017/0013634 A1 | 1/2017 | Tsuboi et al. | |
| 2017/0086219 A1 | 3/2017 | Lee et al. | |
| 2017/0150340 A1 | 5/2017 | Park | |
| 2017/0150512 A1 | 5/2017 | Cao | |
| 2018/0034526 A1 | 2/2018 | Lee et al. | |
| 2018/0054848 A1* | 2/2018 | Yoo | H04W 72/23 |
| 2018/0199334 A1* | 7/2018 | Ying | H04W 72/0413 |
| 2018/0227103 A1 | 8/2018 | Wang et al. | |
| 2018/0316480 A1* | 11/2018 | Ohta | H04W 72/04 |
| 2018/0324790 A1* | 11/2018 | Ohta | H04W 80/06 |
| 2019/0029033 A1 | 1/2019 | Tang et al. | |
| 2019/0104541 A1 | 4/2019 | Lee et al. | |
| 2019/0132861 A1* | 5/2019 | Koorapaty | H04L 1/1896 |
| 2019/0150013 A1* | 5/2019 | Zhang | H04W 24/10 375/224 |
| 2019/0158252 A1* | 5/2019 | Li | H04L 1/1861 |
| 2019/0208506 A1 | 7/2019 | Baldemair et al. | |
| 2019/0222400 A1 | 7/2019 | Bagheri et al. | |
| 2019/0239216 A1 | 8/2019 | Kundu et al. | |
| 2019/0253226 A1* | 8/2019 | Liu | H04L 1/18 |
| 2019/0306765 A1 | 10/2019 | Cirik et al. | |
| 2019/0335534 A1 | 10/2019 | Atarius et al. | |
| 2019/0349079 A1 | 11/2019 | Novlan et al. | |
| 2020/0008189 A1* | 1/2020 | Yin | H04L 1/1858 |
| 2020/0022023 A1* | 1/2020 | Uchino | H04W 28/06 |
| 2020/0037314 A1 | 1/2020 | Xiong et al. | |
| 2020/0058156 A1* | 2/2020 | Tran | G06K 9/6232 |
| 2020/0092727 A1 | 3/2020 | Basu Mallick et al. | |
| 2020/0100239 A1* | 3/2020 | Jassal | H04W 72/0406 |
| 2020/0128576 A1* | 4/2020 | Jung | H04L 1/1861 |
| 2020/0236580 A1 | 7/2020 | Kim et al. | |
| 2020/0296635 A1 | 9/2020 | Rastegardoost et al. | |
| 2020/0344100 A1* | 10/2020 | Matsumura | H04J 13/0074 |
| 2020/0344789 A1 | 10/2020 | Gao | |
| 2021/0050895 A1* | 2/2021 | Kang | H04B 7/0626 |
| 2021/0050948 A1 | 2/2021 | Gao et al. | |
| 2021/0068148 A1* | 3/2021 | Yamamoto | H04W 74/006 |
| 2021/0136793 A1 | 5/2021 | Jiang | |
| 2021/0152292 A1* | 5/2021 | Fu | H04W 52/48 |
| 2021/0184801 A1* | 6/2021 | El Hamss | H04L 1/1854 |
| 2021/0194642 A1 | 6/2021 | Belleschi et al. | |
| 2021/0250967 A1 | 8/2021 | Ye | |
| 2021/0250989 A1 | 8/2021 | Chin et al. | |
| 2021/0329488 A1* | 10/2021 | Touboul | H04L 1/1671 |

FOREIGN PATENT DOCUMENTS

| | | | | |
|---|---|---|---|---|
| CN | 103299571 A | | 9/2013 | |
| CN | 110612692 A | | 12/2019 | |
| EP | 1959693 A1 | * | 8/2008 | ............ H04W 28/06 |
| WO | 2015178566 A1 | | 11/2015 | |
| WO | WO-2017016606 A1 | * | 2/2017 | ........... H04L 1/1671 |
| WO | 2019074437 A1 | | 4/2019 | |

OTHER PUBLICATIONS

Intel Corporation: "HARQ-ACK Multiplexing and Bundling", 3GPP Draft, R1 -1710572, 3GPP TSG RAN WG1 NR Ad-Hoc#2, Intel HARQ Multiplexbundling, 3rd Generation Partnership Project (3GPP), Mobile Competence Centre; France, vol. RAN WG1, No. Qingdao, P.R. China; Jun. 27, 2017-Jun. 30, 2017, Jun. 26, 2017, XP051299779, Retrieved from the Internet: URL:http://www.3gpp.org/ftp/Meetings_3GPP_SYNC/RAN1/Docs/ [retrieved on Jun. 26, 2017], 5 pages.
International Search Report and Written Opinion—PCT/US2021/023944—ISA/EPO—dated Jun. 28, 2021 17 pages.
ITRI: "UCI Enhancements for URLLC", 3GPP Draft, 3GPP TSG RAN WG1 #97, R1-1907310, 3RD Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728749, Retrieved from the Internet: URL: http://www.3gpp.org/ftp/Meetings%5F3GPP%5FSYNC/RAN1/Docs/R1%2D1907310%2Ezip [retrieved on May 13, 2019] 3 pages.
Nokia Siemens Networks, et al., "Remaining Details on Multi-Cell HARQ-ACK and Periodic CSI Multiplexing for PUCCH Format 3", 3GPP Draft, 3GPP TSG-RAN WG1 Meeting #70bis, R1-124172, 3RD Generation Partnership Project (3GPP), Mobile Competence Centre, Sophia-Antipolis Cedex, France, vol. RAN WG1, No. San Diego, USA, Oct. 8, 2012-Oct. 12, 2012, Sep. 29, 2012, XP050662081, Retrieved from the Internet: URL: http://www.3gpp.org/ftp/tsg_ran/WG1_RL1/TSGR1_70b/Docs/ [retrieved on Sep. 29, 2012] 2 pages.
Samsung: "On NR Scheduling Request", 3GPP TSG RAN WG1 Meeting #88, 3GPP Draft, R1-1702993, 3rd Generation Partnership Project (3GPP), Mobile Competence Centre, Sophia-Antipolis Cedex, France, vol. RAN WG1, No. Athens, Greece, Feb. 13, 2017-Feb. 17, 2017, Feb. 12, 2017 (Feb. 12, 2017), XP051210135, Retrieved from the Internet: URL: http://www.3gpp.org/ftp/Meetings_3GPP_SYNC/RAN1/Docs/ [retrieved on Feb. 12, 2017] 4 pages.

* cited by examiner

PHYSICAL UPLINK CONTROL CHANNEL WITH UPLINK MESSAGE SHORT DATA FIELD

BACKGROUND

Time Division Duplex (TDD) cellular communication systems must include uplink data slots to convey periodic reports and feedback to a communication network. An application or service requiring frequent reports or feedback may cause a reduction in available bandwidth to carry data. In particular, services that require frequent uplink feedback, such as a downlink transfer control protocol (TCP) connection, require frequent uplink data slot allocations to provide feedback such as a TCP acknowledgment (TCP Ack).

SUMMARY

Various aspects include systems and methods for transmitting an uplink data message using a control channel message by appending a short data field. Some embodiments include configuring a physical uplink control channel (PUCCH) message to include the uplink data message in a short data field, and sending the PUCCH message including the uplink data message in a short data field. Some aspects may include receiving data from another wireless device in a downlink channel, generating an acknowledgement message responsive to the received data, configuring a physical uplink control channel (PUCCH) message to include the acknowledgement message, and sending the PUCCH message including the acknowledgement message to acknowledge the received data.

In some aspects, the acknowledgment message is a transfer control protocol (TCP) acknowledgment message. In some aspects, configuring the PUCCH message to include the acknowledgement message may include concatenating the acknowledgment message and other information in the PUCCH message. In some aspects, configuring the PUCCH message to include the acknowledgement message may include performing asymmetric header compression on the acknowledgment message within the PUCCH message. Some aspects may further include receiving an instruction from a network element to enable the wireless device to configure the PUCCH message to include the acknowledgment message. Some aspects may further include receiving an instruction from an application executing on the wireless device to enable the wireless device to configure the PUCCH message to include the acknowledgment message.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
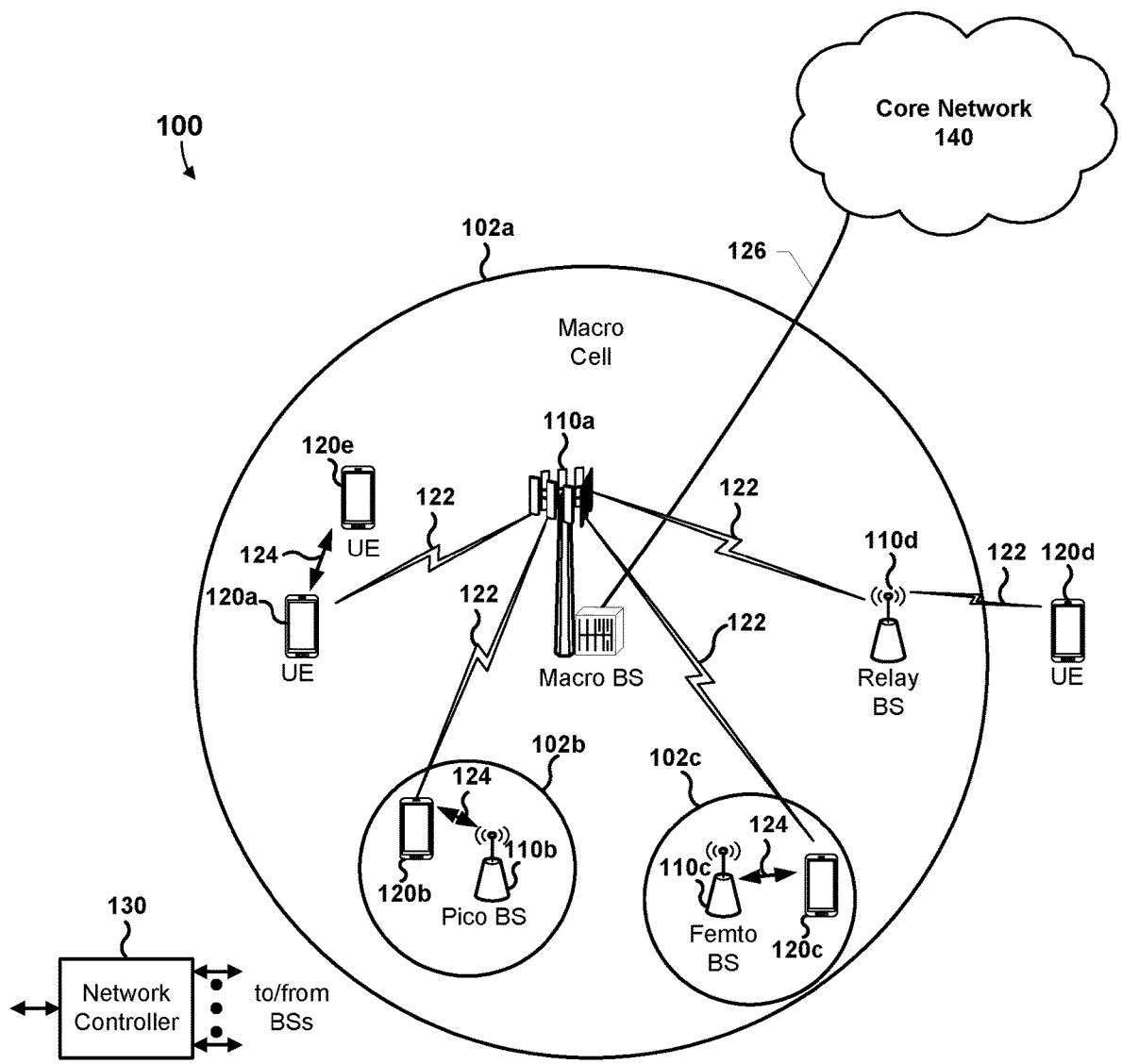
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for communicating information in a physical uplink control channel (PUCCH) message that is in addition to information typically included in the PUCCH message. Various embodiments may improve application layer performance by including such information in the PUCCH message without consuming, for example, uplink data bandwidth, such as physical uplink shared channel (PUSCH) slots.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platform is, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "short data field" is used herein to refer to a field added to a control channel message, such as a PUCCH message, to convey a message or information in addition to information typically included or transmitted in PUCCH messages. Information that is typically transmitted in a PUCCH message includes uplink control information, which may include Hybrid Automatic Repeat Request (HARQ) feedback (e.g., HARQ Ack bits), scheduling requests (SR), and downlink channel state information (CSI). Additional information conveyed in a short data field may include, for example, a TCP acknowledgment (TCP Ack), an ultra-reliable low latency communication (URLLC) uplink transmission, or application information such as a virtual reality (VR) sensor pose. Such additional information that is included in the short data field is referred to herein as an "uplink message." In some embodiments, the short data field may also include control information not typically included in the PUCCH, such as a buffer status report (BSR).

Conventional time division duplex (TDD) cellular communication systems utilize uplink data slots in the PUSCH to convey periodic reports and feedback from a wireless device to a communication network. An application or service requiring frequent reports or feedback may cause a reduction in available bandwidth to carry data. In particular, services that require frequent uplink feedback, such as a downlink transfer control protocol (TCP) connection, require frequent uplink data slot allocations to provide feedback such as a TCP acknowledgment (TCP Ack). This requirement results in a lowering of the downlink duty cycle and a reduction in available data carriage bandwidth for the wireless device. TCP requires a receiving device, such as the wireless device, to acknowledge the successful receipt of data packets. To avoid the inefficiency of waiting for acknowledgment of every packet before sending the next packet, a TCP sending device uses a TCP window to determine a number of packets likely to be sent without loss. The TCP sending device reduces its transmission rate when it does not receive a TCP Ack within an expected timeframe. Thus, feedback latency, such as TCP Ack latency, may dramatically affect data throughput.

Various embodiments enable a wireless device to communicate an uplink message including information that would ordinarily be transmitted in a data channel in a PUCCH message. In some embodiments, the wireless device may configure a PUCCH message with a new short data field that includes the uplink message. In some embodiments, the wireless device may send the PUCCH message including the short data field to convey the uplink message to a communication network.

In some embodiments, the wireless device may use the short data field to convey an acknowledgment of received data that does not utilize data uplink bandwidth, (e.g., uplink slots in a data channel such as a PUSCH). In some embodiments, a wireless device may receive data from a second wireless device in a downlink channel, may generate acknowledgment message responsive to the received data, and may configure a physical uplink control channel (PUCCH) message to include the acknowledgment message. The wireless device may send the PUCCH message including the short data field that includes the acknowledgement message to acknowledge the received data. The acknowledgment message may include, for example, a TCP acknowledgment message.

In some embodiments, the wireless device may concatenate or combine the acknowledgment message and other information in the PUCCH message. In some embodiments, the wireless device may perform asymmetric header compression on the acknowledgement message included in the PUCCH message without compressing other data fields, such as HARQ Ack bits, SR bits, and CSI bits.

In some embodiments, the wireless device may receive an instruction from a network element, such as a base station, to enable the wireless device to configure the PUCCH message to include the acknowledgment message. For example, the wireless device may provide an indication to the base station that the wireless device is configured to generate and provide acknowledgment messages in an uplink control channel message. In some embodiments, the base station may send a message or instructions to the wireless device to enable the wireless device to configure the PUCCH message to include the acknowledgment message.

In some embodiments, the wireless device may receive instructions from an application executing on the wireless device to enable the wireless device to configure the PUCCH message to include the acknowledgment message. For example, an application executing on the wireless device may require relatively frequent uplink transmissions. One example of such an application is a gaming application, that may require small, frequent uplink transmissions of user action data. Further, such an application may suffer from any substantial decrease in data carriage to or from the wireless device. For example, the gaming application may require a large amount of data to be provided via a downlink data channel, such as video data. In some embodiments, the application executing on the wireless device may send a message or instructions enabling the wireless device to configure the PUCCH message to include the acknowledgment message.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using TDD. A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
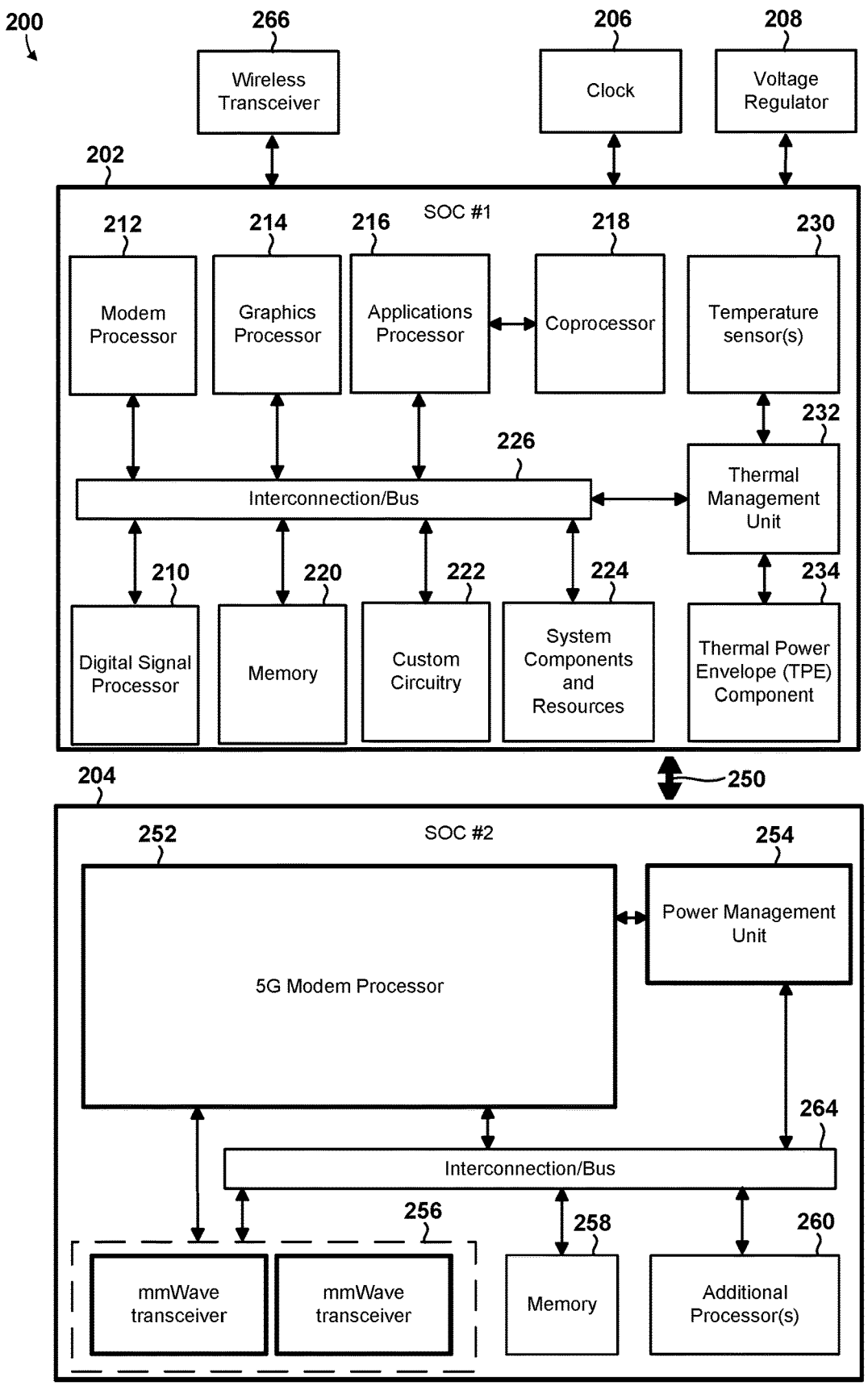
FIG. 2 is a component block diagram illustrating an example computing and wireless modem system suitable for implementing any of the various embodiments.

In some embodiments, two or more mobile devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
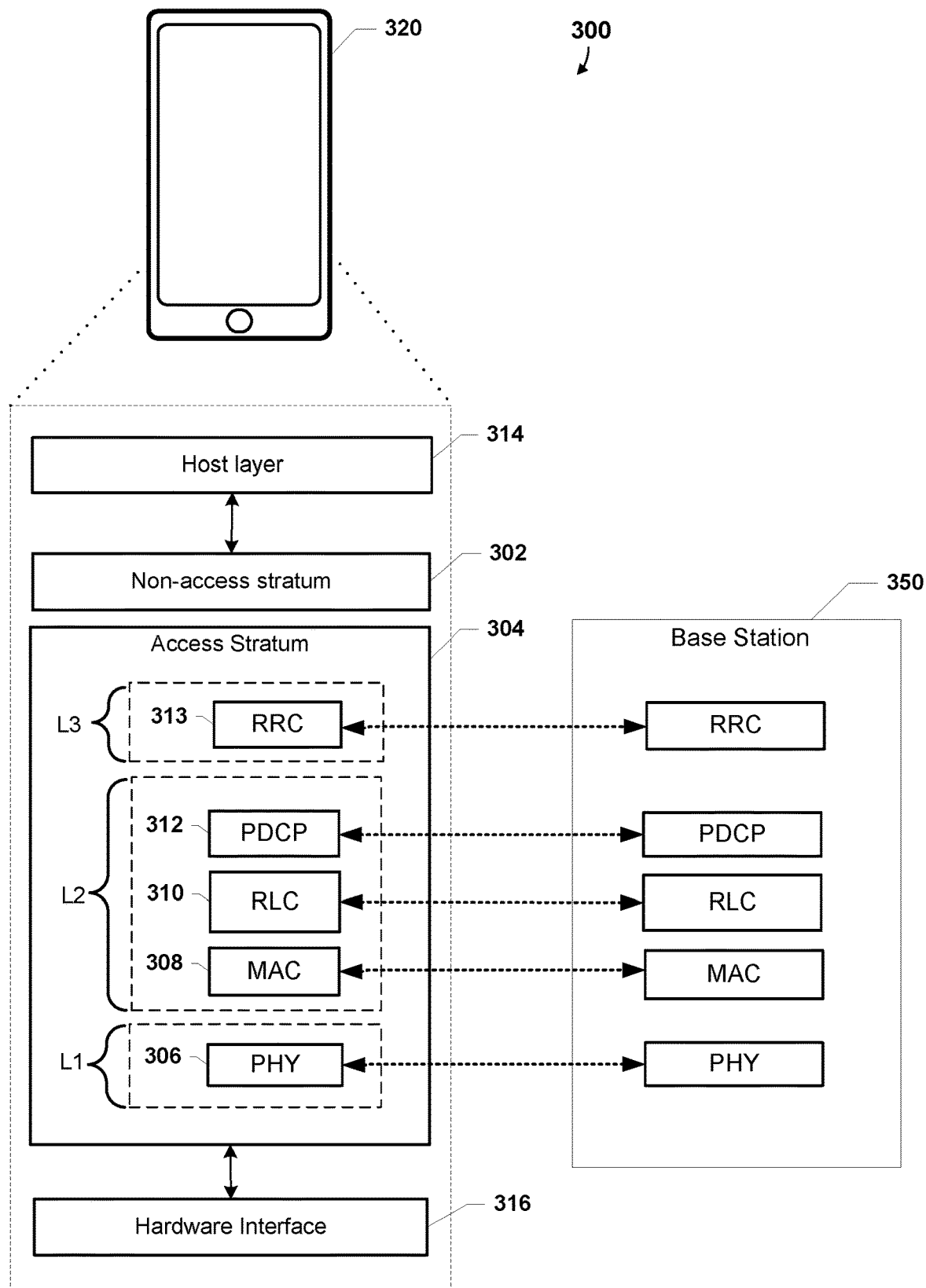
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256, 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and HARQ operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
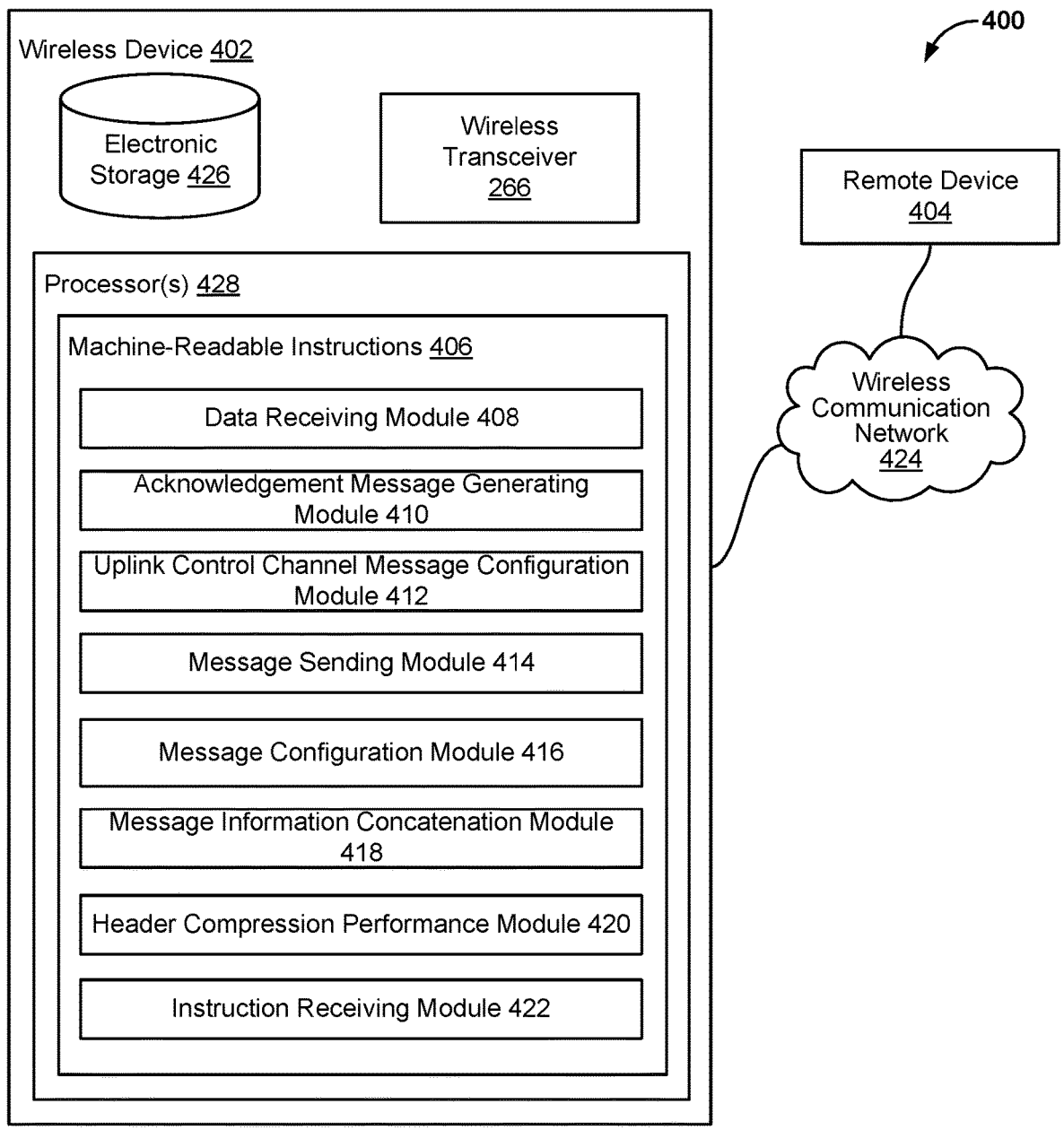
FIG. 4 is a component block diagram illustrating a system configured for generating an acknowledgment of received data performed by a processor of a wireless device in accordance with various embodiments.

FIG. 4 is a component block diagram illustrating a system 400 configured for generating an acknowledgment of received data performed by a processor of a wireless device in accordance with various embodiments. In some embodiments, system 400 may include a wireless device 402 and/or one or more remote platforms 404. With reference to FIGS. 1-4, system 400 may include a wireless device 402 (e.g., 120a-120e, 200, 320) and a second wireless device 404 (e.g., 120a-120e, 200, 320). The wireless device 402 and the second wireless device 404 may communicate over a wireless communication network 424 (aspects of which are illustrated in FIG. 1).

The wireless device 402 may include one or more processors 428 coupled to electronic storage 426 and a wireless transceiver (e.g., 256, 266). The wireless transceiver may be configured to receive messages to be sent in uplink transmissions from the processor(s) 428, and to transmit such messages via an antenna (not shown) to a wireless communication network 424 for relay to remote wireless devices 404. Similarly, the wireless transceiver may be configured to receive messages from remote wireless devices in downlink transmissions from the wireless communication network 424 and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a data receiving module 408, acknowledgement message generating module 410, an uplink control channel message configuration module 412, a message sending module 414, a message configuration module 416, a message information concatenation module 418, a header compression performance module 420, an instruction receiving module 422, or other instruction modules.

The data receiving module 408 may be configured to receive data from a second wireless device (e.g., 404) in a downlink channel.

The acknowledgment message generating module 410 may be configured to generate an acknowledgement message responsive to the received data.

The uplink control channel message configuration module 412 may be configured to configure a physical uplink control channel message to include a short data field that includes an uplink message. In some embodiments, the uplink message may include an acknowledgement message (such as a TCP Ack).

The message sending module 414 may be configured to send the PUCCH message including the short data field to acknowledge the received data.

The message configuration module 416 may be configured to configure the PUCCH message with the short data field to include the uplink message.

The message information concatenation module 418 may be configured to concatenate the acknowledgment message and other information in the PUCCH message.

The header compression performance module 420 may be configured to perform asymmetric header compression on the acknowledgment message included in the PUCCH message without compressing other data fields, such as HARQ Ack bits, SR bits, and CSI bits.

The instruction receiving module 422 may be configured to receive an instruction from a network element to enable the wireless device to configure the PUCCH message to include the acknowledgment message. The instruction receiving module 422 also may be configured to receive an instruction from an application executing on the wireless device to enable the wireless device to configure the PUCCH message to include the acknowledgment message. In some embodiments, the acknowledgment message may be a transfer control protocol acknowledgment (TCP Ack) message.

In some embodiments, the wireless device 402, second wireless device 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which the wireless device 402, second wireless device 404, and/or external resources 424 may be operatively linked via some other communication media.

A second wireless device 404 may include one or more processors configured to execute computer program modules. The computer program modules may be configured to enable an expert or user associated with the given second wireless device 404 to interface with system 400 or provide other functionality attributed herein to the second wireless device 404. In some embodiments, the second wireless device 404 may include one or more wireless devices or other computing platforms.

The wireless device 402 may include communication lines, or ports to enable the exchange of information with a network and/or other computing platforms. Illustration of the wireless device 402 is not intended to be limiting, and the wireless device 402 may include a plurality of hardware, software, and/or firmware components operating together to provide the functionality attributed herein to the wireless device 402.

The electronic storage 426 may include non-transitory storage media that electronically stores information. The electronic storage media of electronic storage 426 may include one or both of system storage that is provided integrally (i.e., substantially non-removable) with the wireless device 402 and/or removable storage that is removably connectable to the wireless device 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the wireless device 402, information received from second wireless device 404, and/or other information that enables the wireless device 402 to function as described herein.

Processor(s) 428 may be configured to provide information processing capabilities in the wireless device 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 is illustrated as a single entity, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408, 410, 412, 414, 416, 418, 420, and/or 422 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-422 described below is for illustrative purposes, and is not intended to be limiting, as any of modules 408-422 may provide more or less functionality than is described. For example, one or more of the modules 408-422 may be eliminated, and some or all of its functionality may be provided by other modules 408-422. As another example, the processor(s) 428 may be configured to execute one or more additional modules that may perform some or all of the functionality attributed below to one of the modules 408-422.

Figure 5A:
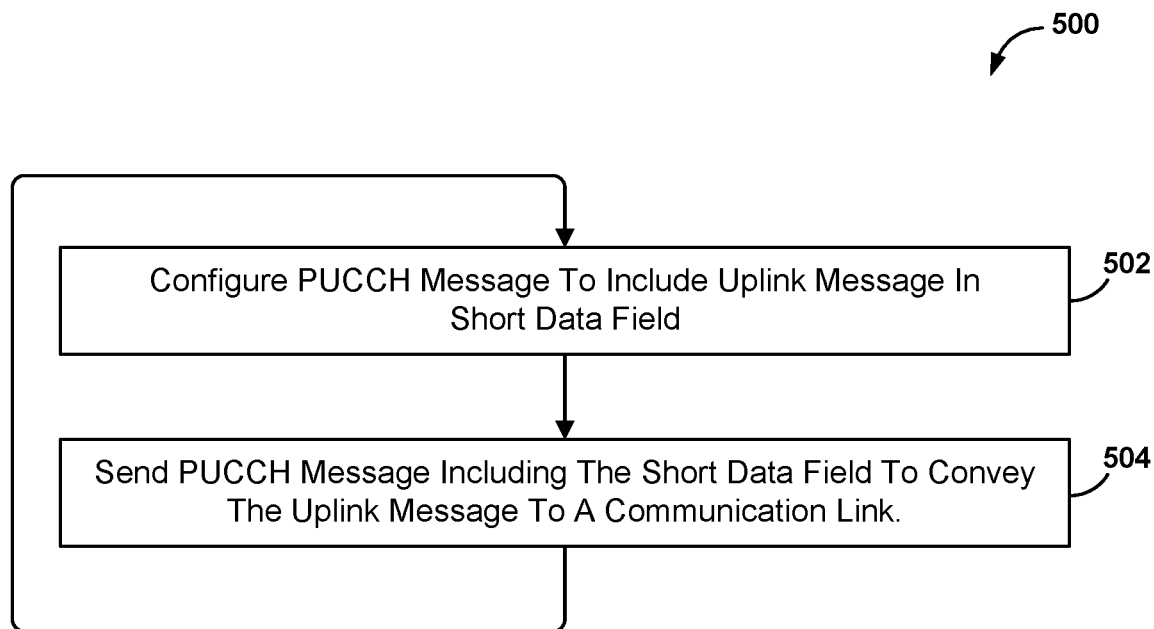
FIG. 5A is a process flow diagram illustrating a method that may be performed by a processor of a wireless device for communicating information in a PUCCH message according to various embodiments.
Figure 5B:
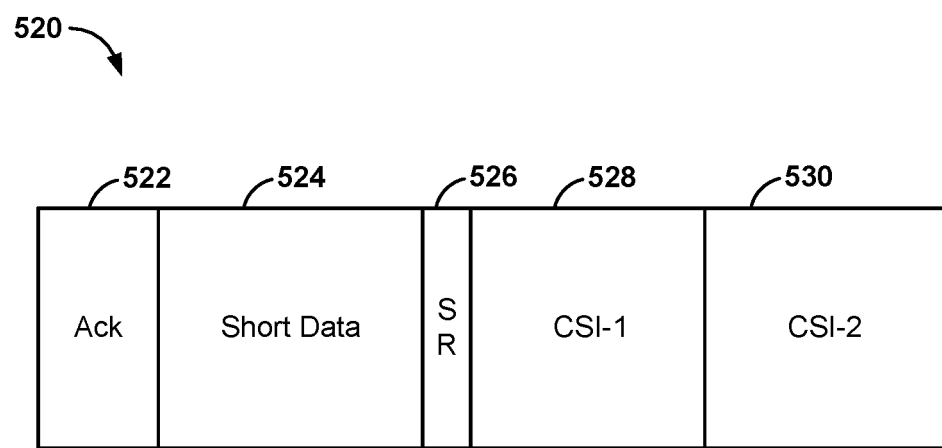
FIG. 5B is a block diagram illustrating an example PUCCH configured to include a short data field according to various embodiments.

FIG. 5A is a process flow diagram illustrating a method 500 that may be performed by a processor of a wireless device for communicating information in a PUCCH message according to various embodiments. FIG. 5B is a block diagram illustrating an example PUCCH configured in the method 500 to include a short data field according to various embodiments. With reference to FIGS. 1-5B, the method 500 may be implemented by a processor (e.g., 210, 212, 214, 216, 218, 252, 260, 428) of a wireless device (e.g., the wireless device 120a-120e, 200, 320, 402).

Referring to FIG. 5A, in block 502, the processor may configure a PUCCH message to include an uplink message in a short data field. For example, FIG. 5B illustrates an example PUCCH 520. The processor may configure the PUCCH message 520 to include a short data field 524. In some embodiments, the processor may configure the PUCCH message 520 such that the short data field 524 is immediately subsequent to another field, such as Ack field 522. In some embodiments, the processor may configure the PUCCH message 520 such that the short data field 524 precedes one or more other data fields, data structures, or messages, such as a scheduling request (SR) field 526, a first part of channel state information (CSI-1) field 528, and/or a second part of channel state information (CSI-2) field 530. In some embodiments, the processor may configure the short data field to include information in an uplink message that would otherwise be sent in a data channel uplink message, such as an uplink data message, or in an uplink control message other than the PUCCH. Means for performing functions of the operations in block 504 may include the processor (e.g., 210, 212, 214, 216, 218, 252, 260, 428).

In block 504, the processor may send the PUCCH message including the short data field to convey the one or more uplink messages to a communication network. For example, the processor may send the PUCCH message to a base station (e.g., the base station 110a-110d) to convey the one or more uplink messages to the communication network. In some embodiments, the one or more uplink messages may be sent to the base station. In some embodiments the one or more uplink messages may be conveyed by the communication network to another device, such as a TCP sender device. Means for performing functions of the operations in block 504 may include the processor (e.g., 210, 212, 214, 216, 218, 252, 260, 428) coupled to a wireless transceiver (e.g., 256, 266).

The method 500 may be repeated continuously or periodically as the processor may again perform the operations of block 502.

Figure 5C:
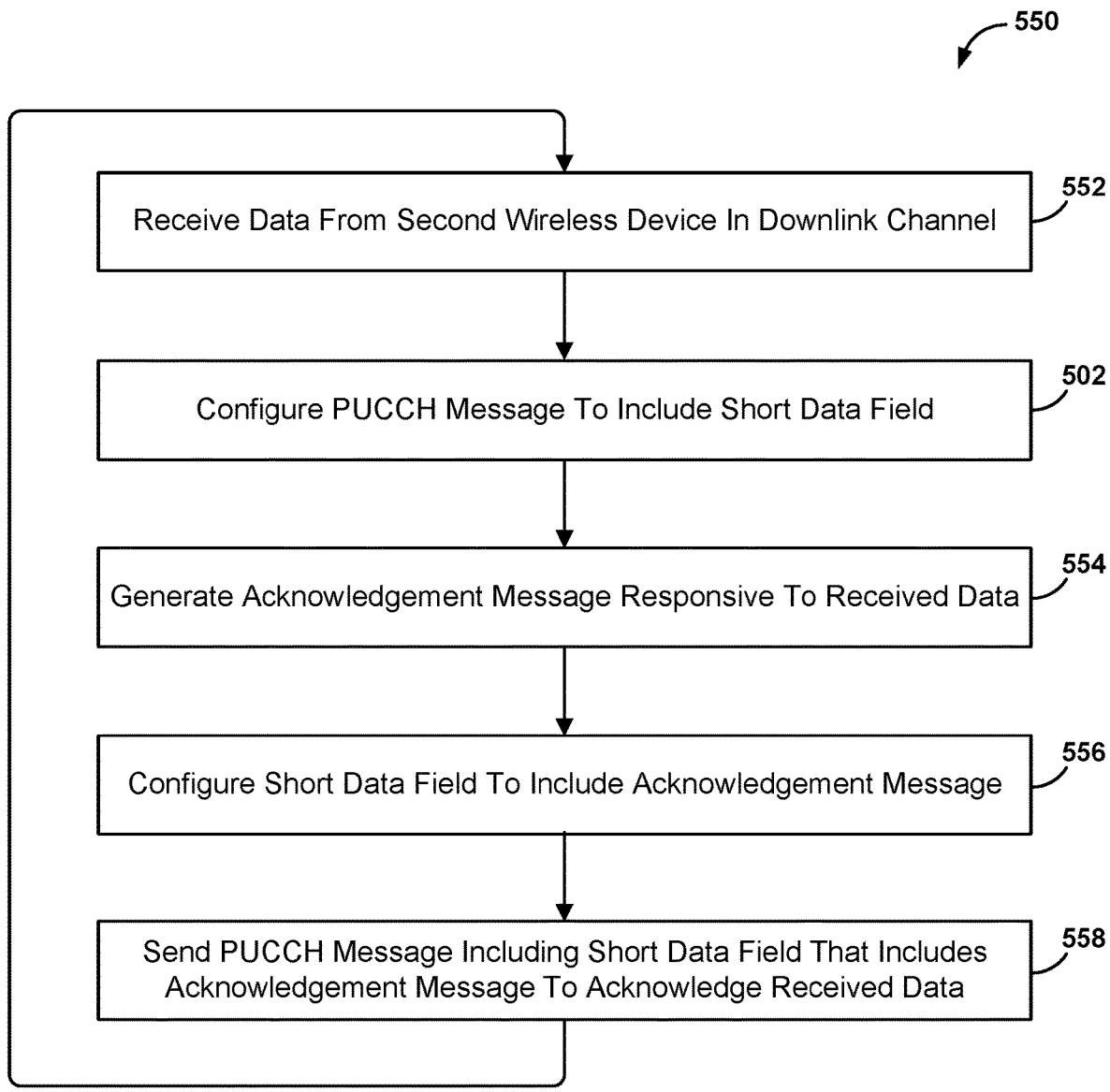
FIG. 5C is a process flow diagram illustrating operations 550 that may be performed by a processor of a wireless device as part of the method for communicating information in a PUCCH message according to various embodiments.

FIG. 5C is a process flow diagram illustrating operations 550 that may be performed by a processor of a wireless device as part of the method 500 according to various embodiments. In some embodiments, the operations 550 may that enable the processor of the wireless device to generate an acknowledgment of received data according to various embodiments.

In block 552, the processor may receive data in a downlink channel from a second wireless device (e.g., the wireless device 120a-120e, 200, 320, 404). In some embodiments, the second wireless device may function as a TCP sender device using TCP to send data to the (first) wireless device. Means for performing functions of the operations in block 552 may include the processor (e.g., 210, 212, 214, 216, 218, 252, 260, 428) coupled to a wireless transceiver (e.g., 256, 266).

The processor may then perform the operations of block 502 (FIG. 5A), as described.

In block 554, the processor may generate an acknowledgement message responsive to the received data. In some embodiments, the acknowledgment message may include a TCP acknowledgment (Ack) message. Means for performing functions of the operations in block 554 may include the processor (e.g., 210, 212, 214, 216, 218, 252, 260, 428).

In block 556, the processor may configure the short data field to include the acknowledgement message. In some embodiments, the processor may configure the short data field (e.g., 524) to include the acknowledgment message. Means for performing functions of the operations in block 556 may include the processor (e.g., 210, 212, 214, 216, 218, 252, 260, 428).

In block 558, the processor may send the PUCCH message including the short data field that includes acknowledgement message to acknowledge the received data. Means for performing functions of the operations in block 558 may include the processor (e.g., 210, 212, 214, 216, 218, 252, 260, 428) coupled to a wireless transceiver (e.g., 256, 266).

The method 550 may be repeated continuously or periodically as the processor may again perform the operations of block 552.

FIGS. 6A-6D are process flow diagrams illustrating operations 600a-600d that may be performed by a processor of a wireless device as part of the method 500 according to various embodiments. With reference to FIGS. 1-6D, the operations 600a-600d may be performed by a processor (e.g., 210, 212, 214, 216, 218, 252, 260, 428) of a wireless device (e.g., 120a-120e, 200, 320, 402).

Figure 6A:
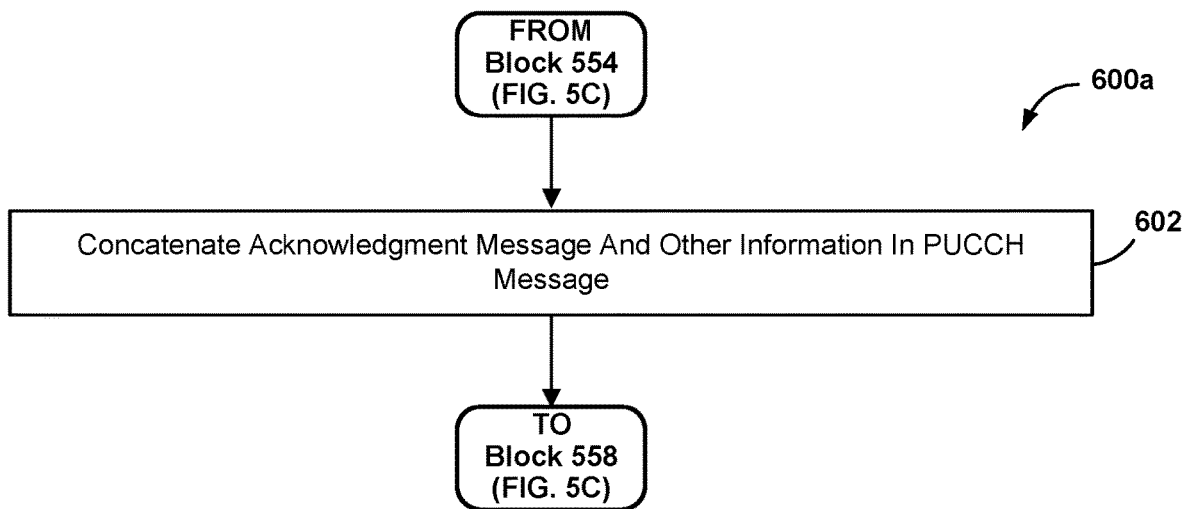
FIGS. 6A-6D are process flow diagrams illustrating operations that may be performed by a processor of a mobile device as part of a method for communicating information in a PUCCH message according to various embodiments.

Referring to FIG. 6A, following the operations of block 554 (FIG. 5C), the processor may concatenate the acknowledgment message and other information in the PUCCH message in block 602. For example, the processor may concatenate the acknowledgment message with one or more of a HARQ message, a channel state indicator (CSI) message, a scheduling request (SR), or other suitable information in the PUCCH message. Means for performing functions of the operations in block 602 may include the processor (e.g., 210, 212, 214, 216, 218, 252, 260, 428).

The processor may then perform the operations of block 558 (FIG. 5C) as described.

Figure 6B:
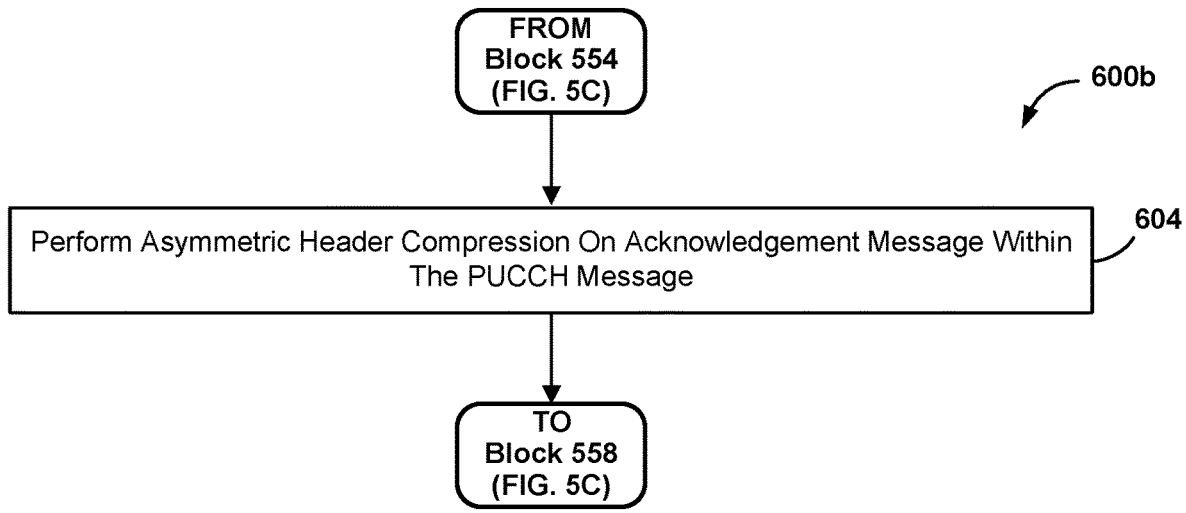

Referring to FIG. 6B, following the operations of block 554 (FIG. 5C), the processor may perform asymmetric header compression on the short data field that may include the acknowledgment message (e.g., a TCP ack message) within the PUCCH message in block 604. Other fields in the PUCCH message, including the HARQ Ack bits, SR bits, and CSI bits, are not compressed. Means for performing functions of the operations in block 604 may include the processor (e.g., 210, 212, 214, 216, 218, 252, 260, 428).

The processor may then perform the operations of block 558 (FIG. 5C) as described.

Figure 6C:
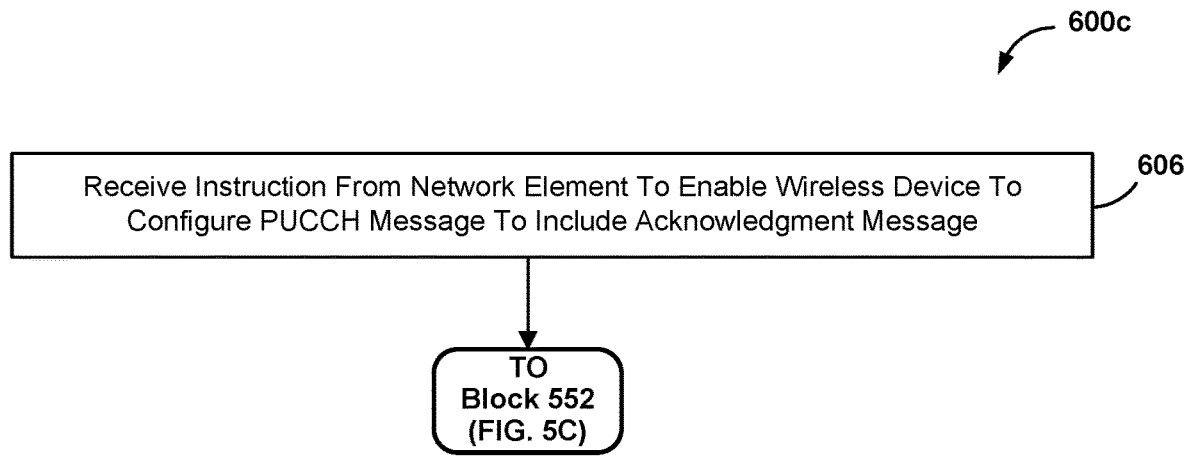

Referring to FIG. 6C, the processor may receive an instruction from a network element to enable the wireless device to configure the PUCCH message to include the acknowledgment message in block 606. For example, the processor may receive an instruction from a network element, such as a base station (e.g., 110), to enable the wireless device to configure the PUCCH message to include the acknowledgment message. In some embodiments, the wireless device may provide an indication to the base station that the wireless device is configured to generate and provide acknowledgment messages in an uplink control channel message. In some embodiments, the base station may send a message or an instruction to the wireless device to enable the wireless device to configure the PUCCH message to include the acknowledgment message. Means for performing functions of the operations in block 604 may include the processor (e.g., 210, 212, 214, 216, 218, 252, 260, 428) coupled to a wireless transceiver (e.g., 256, 266).

The processor may then perform the operations of block 552 (FIG. 5C) as described.

Figure 6D:
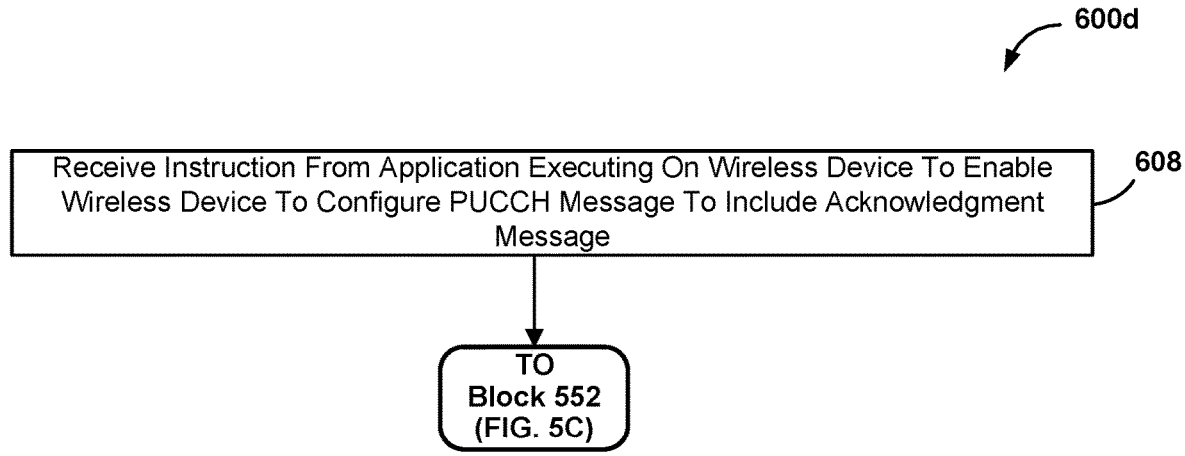

Referring to FIG. 6D, the processor may receive an instruction from an application executing on the wireless device to enable the wireless device to configure the PUCCH message to include the acknowledgment message in block 608. In some embodiments, an application executing on the wireless device may require relatively frequent uplink transmissions. For example, a gaming application may require small, frequent uplink transmissions of user action data. Such an application may suffer from any substantial decrease in data carriage to or from the wireless device. Further, such an application may require a large amount of data to be provided via a downlink data channel (for example, video or multimedia data for a gaming application). In some embodiments, the application executing on the wireless device may send a message or an instruction enabling the wireless device to configure the PUCCH message to include the acknowledgment message. Means for performing functions of the operations in block 604 may include the processor (e.g., 210, 212, 214, 216, 218, 252, 260, 428) coupled to a wireless transceiver (e.g., 256, 266).

The processor may then perform the operations of block 552 (FIG. 5C) as described.

Figure 7:
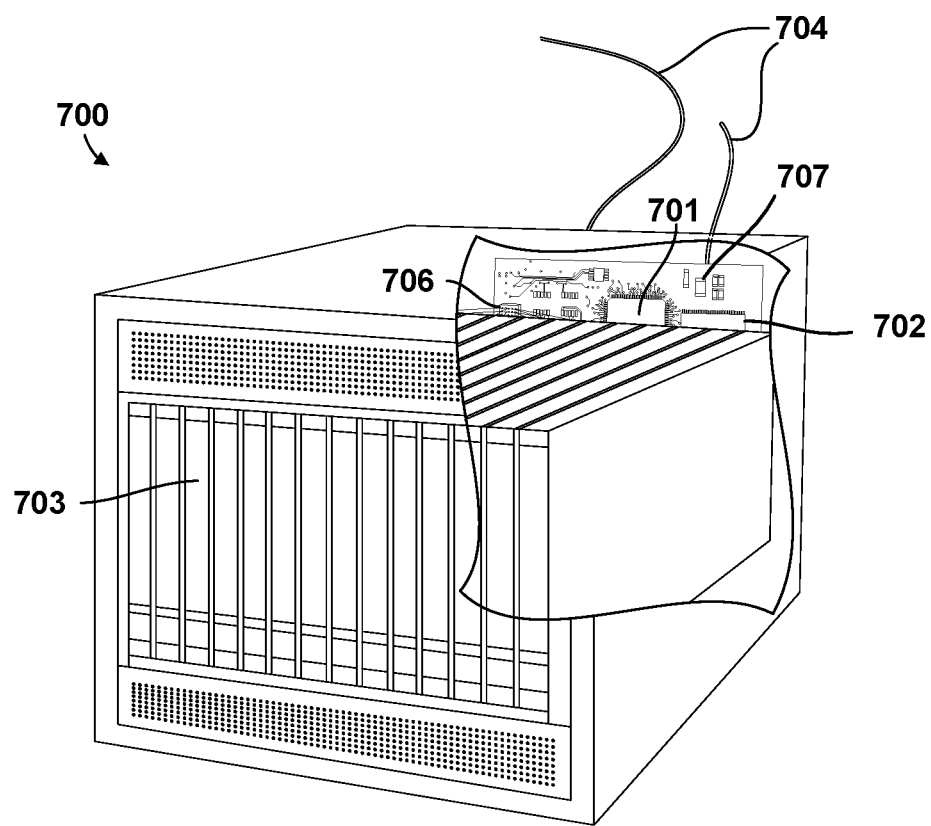
FIG. 7 is a component block diagram of a network computing device suitable for use with various embodiments.

FIG. 7 is a component block diagram of a network computing device 700 suitable for use with various embodiments (e.g., in a base station). Such network computing devices may include at least the components illustrated in FIG. 7. With reference to FIGS. 1-7, the network computing device 700 may include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
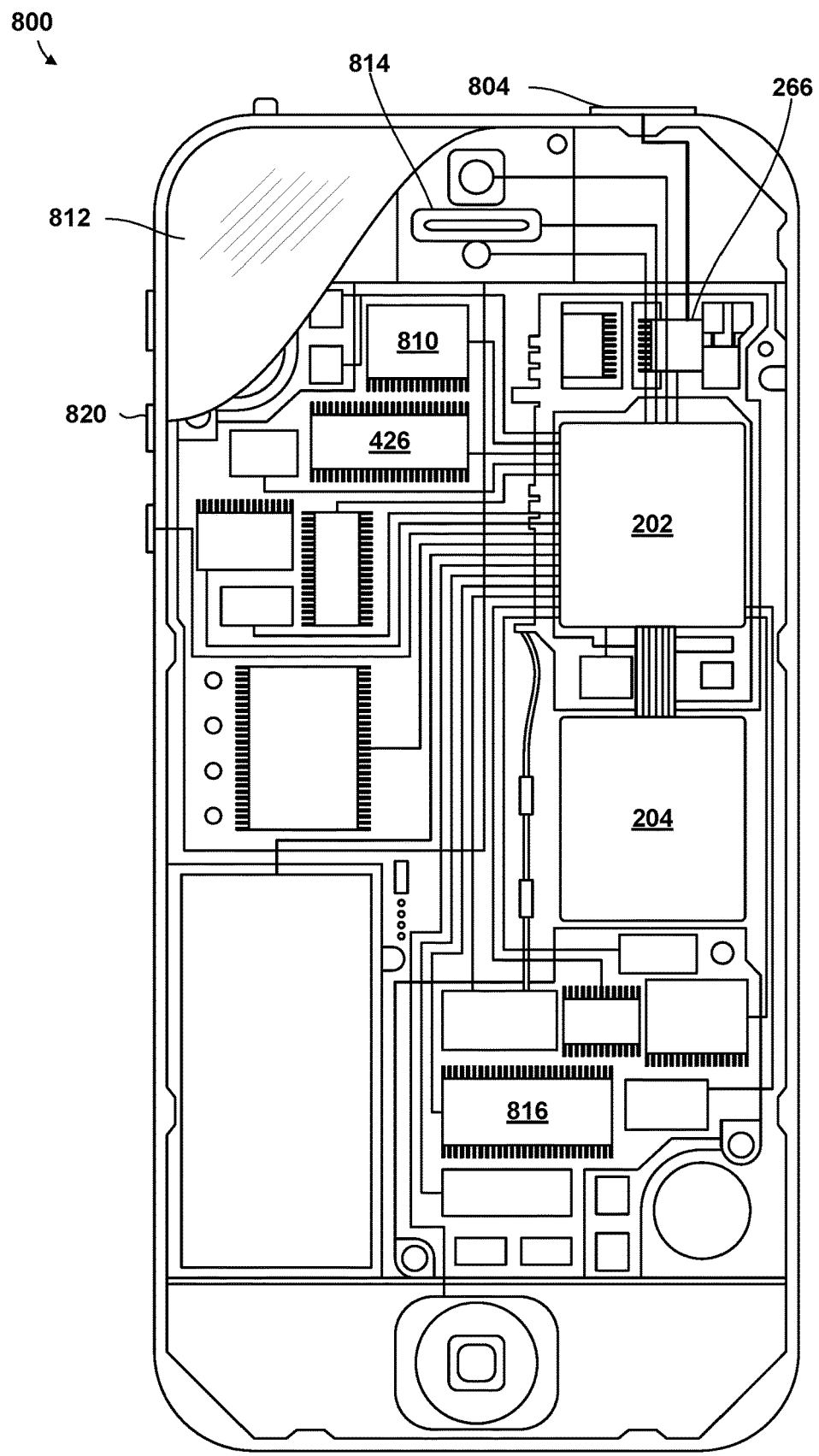
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (e.g., the wireless device 120a-120e, 200, 320, 402) an example of which is illustrated in FIG. 8 in the form of a smartphone. The wireless device 800 may include a first SOC 202 (e.g., a SOC-CPU) coupled to a second SOC 204 (e.g., a 5G capable SOC). The first and second SOCs 202, 204 may be coupled to internal memory 426, 816, a display 812, and to a speaker 814. Additionally, the wireless device 800 may include an antenna 804 for sending and receiving electromagnetic radiation that may be connected to a wireless data link and/or cellular telephone transceiver 266 coupled to one or more processors in the first and/or second SOCs 202, 204. The wireless device 800 may also include menu selection buttons or rocker switches 820 for receiving user inputs.

The wireless device 800 also may include a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 810 may include a digital signal processor (DSP) circuit (not shown separately).

The processors of the wireless network computing device 700 and the wireless device 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 426, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 550, and 600a-600d may be substituted for or combined with one or more operations of the methods 500, 550, and 600a-600d.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, DISCRETE hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless device for communicating information in a physical uplink control channel (PUCCH) message, comprising:
    configuring a PUCCH message to include an uplink message in a short data field, wherein the uplink message includes an acknowledgment message, an ultra-reliable low latency communication (URLLC) uplink transmission, and a buffer status report (BSR);
    concatenating the short data field, a Hybrid Automatic Repeat Request (HARQ) field, a scheduling request (SR) field, and a channel state information (CSI) field in the PUCCH message; and
    sending the PUCCH message including the short data field to convey the uplink message to a communication network.

2. The method of claim 1, further comprising:
   receiving data from another wireless device in a downlink channel,
   wherein sending the PUCCH message including the short data field to convey the uplink message to the communication network comprises sending the PUCCH message to acknowledge the received data.

3. The method of claim 2, further comprising receiving an instruction from an application executing on the wireless device to enable the wireless device to configure the PUCCH message to include the uplink message.

4. The method of claim 1, wherein the acknowledgment message is a transfer control protocol (TCP) acknowledgment message.

5. The method of claim 1, further comprising performing asymmetric header compression on the acknowledgment message within the PUCCH message.

6. The method of claim 1, further comprising receiving an instruction from a network element to enable the wireless device to configure the PUCCH message to include the uplink message.

7. A wireless device, comprising:
    a wireless transceiver; and
    a processor coupled to the wireless transceiver and configured with processor executable instructions to:
       configure a physical uplink control channel (PUCCH) message to include an uplink message in a short data field, wherein the uplink message includes an acknowledgment message, an ultra-reliable low latency communication (URLLC) uplink transmission, and a buffer status report (BSR);
       concatenate the short data field, a Hybrid Automatic Repeat Request (HARQ) field, a scheduling request (SR) field, and a channel state information (CSI) field in the PUCCH message; and
       send the PUCCH message including the short data field to convey the uplink message to a communication network.

8. The wireless device of claim 7, wherein the processor is further configured with processor-executable instructions to receive data from another wireless device in a downlink channel; and
    wherein the processor is further configured with processor-executable instructions to send the PUCCH message to acknowledge the received data.

9. The wireless device of claim 7, wherein the acknowledgment message is a transfer control protocol (TCP) acknowledgment message.

10. The wireless device of claim 7, wherein the processor is further configured with processor-executable instructions to perform asymmetric header compression on the acknowledgment message within the PUCCH message.

11. The wireless device of claim 8, wherein the processor is further configured with processor-executable instructions to receive an instruction from a network element to enable the wireless device to configure the PUCCH message to include the uplink message.

12. The wireless device of claim 7, wherein the processor is further configured with processor-executable instructions to receive an instruction from an application executing on the wireless device to enable the wireless device to configure the PUCCH message to include the uplink message.

13. A processor device configured for use within a wireless device, comprising:
    a processor configured with processor executable instructions to:
       configure a physical uplink control channel (PUCCH) message to include an uplink message in a short data field, wherein the uplink message includes an acknowledgment message, an ultra-reliable low latency communication (URLLC) uplink transmission, and a buffer status report (BSR);
       concatenate the short data field, a Hybrid Automatic Repeat Request (HARQ) field, a scheduling request (SR) field, and a channel state information (CSI) field in the PUCCH message in the PUCCH message; and
       send the PUCCH message including the short data field to convey the uplink message to a communication network.

14. The processing device of claim 13, wherein the processor is further configured with processor-executable instructions to receive data from another wireless device in a downlink channel; and wherein the processor is further configured with processor-executable instructions to send the PUCCH message to acknowledge the received data.

15. The processing device of claim 13, wherein the acknowledgment message is a transfer control protocol (TCP) acknowledgment message.

16. The processing device of claim 13, wherein the processor is further configured with processor-executable instructions to perform asymmetric header compression on the acknowledgment message within the PUCCH message.

17. The processing device of claim 13, wherein the processor is further configured with processor-executable instructions to receive an instruction from a network element to enable the processing device to configure the PUCCH message to include the uplink message.

18. The processing device of claim 13, wherein the processor is further configured with processor-executable instructions to receive an instruction from an application executing on the processing device to enable the processing device to configure the PUCCH message to include the uplink message.

19. A non-transitory processor-readable medium having stored thereon processor-executable instructions configured to cause a processor of a wireless device to perform operations comprising:
configuring a physical uplink control channel (PUCCH) message to include an uplink message in a short data field, wherein the uplink message includes an acknowledgment message, an ultra-reliable low latency communication (URLLC) uplink transmission, and a buffer status report (BSR);
concatenating the short data field, a Hybrid Automatic Repeat Request (HARQ) field, a scheduling request (SR) field, and a channel state information (CSI) field in the PUCCH message in the PUCCH message; and
sending the PUCCH message including the short data field to convey the uplink message to a communication network.

20. The non-transitory processor-readable medium of claim 19, wherein the stored processor-executable instructions are configured to cause a processor of a wireless device to perform operations further comprising:
receiving data from another wireless device in a downlink channel; and
wherein the stored processor-executable instructions are configured to cause a processor of a wireless device to perform operations such that sending the PUCCH message including the short data field to convey the uplink message to the communication network comprises sending the PUCCH message to acknowledge the received data.

21. The non-transitory processor-readable medium of claim 20, wherein the acknowledgment message is a transfer control protocol (TCP) acknowledgment message.

22. The non-transitory processor-readable medium of claim 20, wherein the stored processor-executable instructions are configured to cause a processor of a wireless device to perform operations further comprising performing asymmetric header compression on the acknowledgment message within the PUCCH message.

23. The non-transitory processor-readable medium of claim 20, wherein the stored processor-executable instructions are configured to cause a processor of a wireless device to perform operations further comprising receiving an instruction from a network element to enable the wireless device to configure the PUCCH message to include the uplink message.

24. The non-transitory processor-readable medium of claim 20, wherein the stored processor-executable instructions are configured to cause a processor of a wireless device to perform operations further comprising receiving an instruction from an application executing on the wireless device to enable the wireless device to configure the PUCCH message to include the uplink message.

* * * * *